(12) United States Patent
Mukerjee et al.

(10) Patent No.: US 9,437,880 B2
(45) Date of Patent: Sep. 6, 2016

(54) METHOD OF MANUFACTURING A FUEL CELL STACK HAVING AN ELECTRICALLY CONDUCTIVE INTERCONNECT

(71) Applicants: Subhasish Mukerjee, Pittsford, NY (US); Karl Jacob Haltiner, Jr., Fairport, NY (US); Kerry D. Meinhardt, Richland, WA (US); Jin Yong Kim, Richland, WA (US); Eric S. Mast, Richland, WA (US); Vincent L. Sprenkle, Richland, WA (US)

(72) Inventors: Subhasish Mukerjee, Pittsford, NY (US); Karl Jacob Haltiner, Jr., Fairport, NY (US); Kerry D. Meinhardt, Richland, WA (US); Jin Yong Kim, Richland, WA (US); Eric S. Mast, Richland, WA (US); Vincent L. Sprenkle, Richland, WA (US)

(73) Assignees: Delphi Technologies, Inc., Troy, MI (US); Battelle Memorial Institute, Richmond, WA (US)

( * ) Notice: Subject to any disclaimer, the term of this patent is extended or adjusted under 35 U.S.C. 154(b) by 797 days.

(21) Appl. No.: 13/623,455

(22) Filed: Sep. 20, 2012

(65) Prior Publication Data
US 2015/0303490 A1     Oct. 22, 2015

Related U.S. Application Data

(60) Continuation-in-part of application No. 13/039,728, filed on Mar. 3, 2011, now abandoned, and a division of application No. 11/499,583, filed on Aug. 4, 2006, now abandoned.

(51) Int. Cl.
| | |
|---|---|
| H01M 8/14 | (2006.01) |
| H01M 8/02 | (2016.01) |
| H01M 8/24 | (2016.01) |
| H01M 8/12 | (2016.01) |

(52) U.S. Cl.
CPC .......... *H01M 8/0228* (2013.01); *H01M 8/021* (2013.01); *H01M 8/1246* (2013.01); *H01M 8/24* (2013.01); *H01M 2008/1293* (2013.01); *H01M 2300/0071* (2013.01)

(58) Field of Classification Search
None
See application file for complete search history.

(56) References Cited

U.S. PATENT DOCUMENTS

| | | | | | |
|---|---|---|---|---|---|
| 4,013,487 | A | * | 3/1977 | Ramqvist et al. | 148/220 |
| 4,596,611 | A | * | 6/1986 | Dawes et al. | 148/217 |
| 4,791,035 | A | * | 12/1988 | Reichner | 429/456 |
| 5,702,837 | A | * | 12/1997 | Xue | 429/465 |
| 6,054,231 | A | * | 4/2000 | Virkar et al. | 429/465 |

OTHER PUBLICATIONS

Quadakkeas,W.J.,Selectively Coated Bipolar Plate, Canadian Patent No. 2,240,270, WO 97/23006, Jun. 26, 1997.*

* cited by examiner

*Primary Examiner* — Patrick Ryan
*Assistant Examiner* — Jose Colucci Rios
(74) *Attorney, Agent, or Firm* — Thomas N. Twomey

(57) ABSTRACT

A method of manufacturing a solid oxide fuel cell stack having an electrically conductive interconnect, including the steps of: (a) providing a first fuel cell and a second fuel cell, (b) providing a substrate having an iron-chromium alloy, (c) depositing a layer of metallic cobalt over a portion of substrate surface, (d) subjecting the layer of metallic cobalt to reducing conditions, (e) then exposing the remaining portion of the layer of metallic cobalt to oxidizing conditions for a predetermined time and temperature, such that the surface portion of the layer of metallic cobalt is oxidized to cobalt oxide, thereby forming the electrically conductive interconnect having a layer of metallic cobalt sandwiched between a surface layer of cobalt oxide and the layer of cobalt-iron-chromium alloy, and (f) sandwiching the substrate between the first and second fuel cells.

5 Claims, 2 Drawing Sheets

METHOD OF MANUFACTURING A FUEL CELL STACK HAVING AN ELECTRICALLY CONDUCTIVE INTERCONNECT

CROSS-REFERENCE TO RELATED APPLICATIONS

This application is a continuation-in-part of co-pending U.S. patent application Ser. No. 13/039,728, filed on Mar. 3, 2011, which is a divisional of U.S. patent application Ser. No. 11/499,583 filed on Aug. 4, 2006. Each of the U.S. patent application Ser. No. 13/039,728 and of U.S. patent application Ser. No. 11/499,583 is hereby incorporated by reference in its entirety.

GOVERNMENT-SPONSORED STATEMENT

This invention was made with United States Government support under Government Contract/Purchase Order No. DE-FC26-02NT41246. The Government has certain rights in this invention.

TECHNICAL FIELD

The present invention relates to fuel cells, more particularly to solid-oxide fuel cells, and most particularly to a solid oxide fuel cell stack that includes a cobalt-containing interconnect surface.

BACKGROUND OF THE INVENTION

A fuel cell is an energy conversion device that generates electricity and heat by electrochemically combining a gaseous fuel, for example, hydrogen, carbon monoxide, or a hydrocarbon, with an oxidant such as air or oxygen, across an ion-conducting electrolyte. The fuel cell converts chemical energy into electrical energy, which may then be used by a high-efficiency electric motor, or stored. A solid oxide fuel cell (SOFC) is frequently constructed of solid-state materials, typically utilizing an ion conductive oxide ceramic as the electrolyte. A conventional electrochemical cell in a SOFC is comprised of an anode and a cathode with an electrolyte disposed therebetween. The oxidant passes over the oxygen electrode or cathode while the fuel passes over the fuel electrode or anode, generating electricity, water, and heat.

In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages may be attained by electrically connecting a plurality of electrochemical cells in series to form a stack.

U.S. Pat. No. 6,737,182, the disclosure of which is incorporated herein by reference, discloses a solid oxide fuel cell stack comprising an electrochemical cell that has an electrolyte disposed between and in ionic communication with a first and second electrode, and an interconnect that is in fluid and thermal communication with at least a portion of the electrochemical cell, the interconnect being configured to receive electrical energy and thereby act as a heating element.

U.S. Patent Application Publication No. 2005/0153190, the disclosure of which is incorporated herein by reference, discloses a solid oxide fuel cell stack that comprises flexible thin foil interconnect elements and thin spacer elements that can conform to nonplanarities in the stack's electrolyte elements, thereby avoiding the inducing of torsional stresses in the electrolyte elements.

SUMMARY OF THE INVENTION

A method of manufacturing a solid oxide fuel cell stack having an electrically conductive interconnect, including the steps of: (a) providing a first fuel cell and a second fuel cell, (b) providing a substrate having an iron-chromium alloy, (c) depositing a layer of metallic cobalt over a portion of substrate surface, (d) subjecting the layer of metallic cobalt to reducing conditions, (e) then exposing the remaining portion of the layer of metallic cobalt to oxidizing conditions for a predetermined time and temperature, such that the surface portion of the layer of metallic cobalt is oxidized to cobalt oxide, thereby forming the electrically conductive interconnect having a layer of metallic cobalt sandwiched between a surface layer of cobalt oxide and the layer of cobalt-iron-chromium alloy, and (f) sandwiching the substrate between the first and second fuel cells.

BRIEF DESCRIPTION OF THE DRAWINGS

The present invention will now be described, by way of example, with reference to the accompanying drawings, in which.

DESCRIPTION OF THE PREFERRED EMBODIMENTS

Solid oxide fuel cell stacks typically include interconnects fabricated from metallic materials, which are commonly chromium-containing metal alloys. Fuel cell cathodes are typically formed from mixed oxides such as perovskites $ABO_3$, where A represents a metal such as lanthanum, cerium, calcium, sodium, strontium, lead, praseodymium, rare earth metals and mixtures thereof, and B represents titanium, niobium, iron, cobalt, manganese, nickel and mixtures thereof.

Under typical high temperature operating conditions, e.g., about 750° C., the chromium included in the alloy volatilizes and reacts with oxygen and moisture from the air to generate chromium oxide and other related species, as shown below:

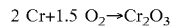

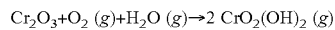

$Cr_2O_3$ and $CrO_2(OH)_2$ in the gas phase undergo reaction with the cathode and degrade its performance and durability. This adverse effect is prevented or mitigated by the present invention.

Figure 1:
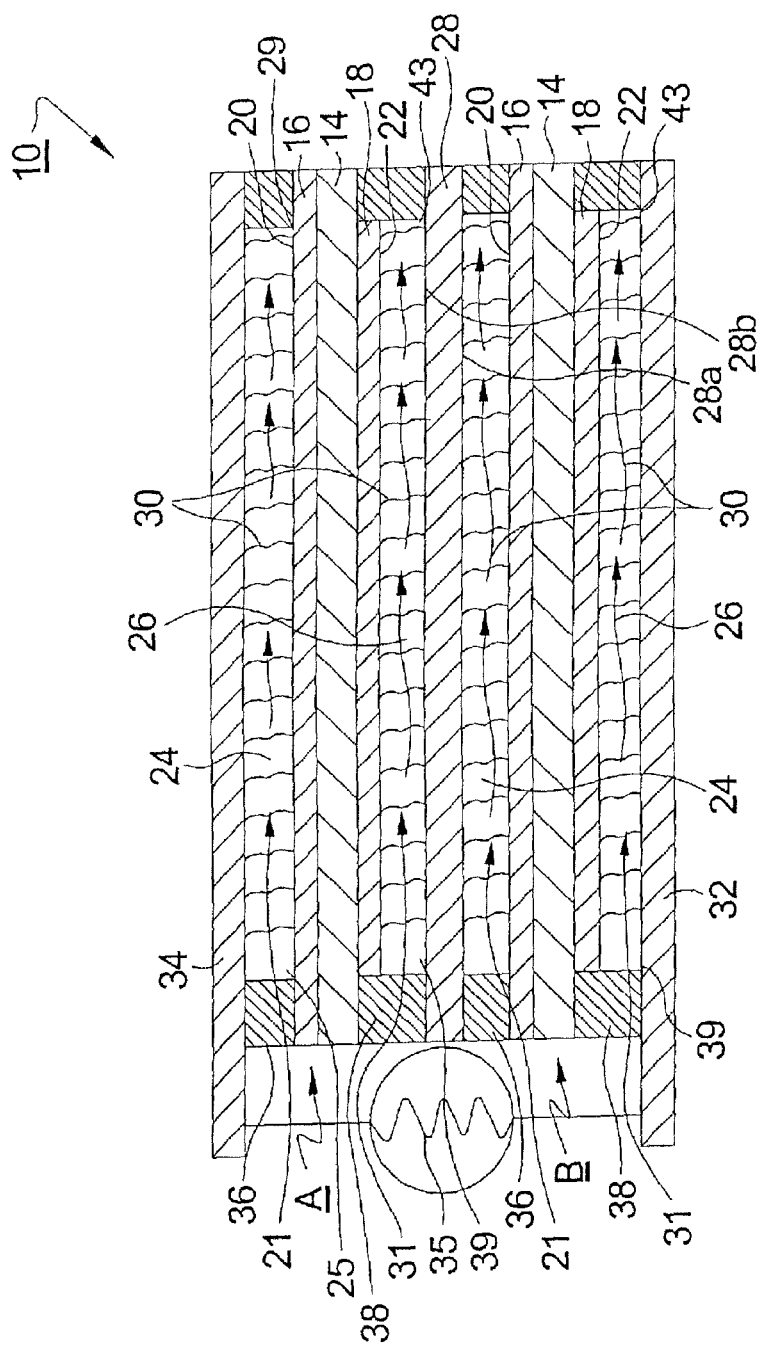
FIG. 1 is a schematic cross-sectional view of a two-cell stack of solid oxide fuel cells in accordance with the present invention.

Referring to FIG. 1, a fuel cell stack 10 includes elements normal in the art to solid oxide fuel cell stacks comprising more than one fuel cell. The example shown includes two fuel cells A and B, connected in series, and is of a class of such fuel cells said to be "anode-supported" in that the anode is a structural element having the electrolyte and cathode deposited upon it. Element thicknesses as shown are not to scale.

Each fuel cell includes a solid electrolyte 14 separating an anode 16 and a cathode 18. Each anode and cathode is in direct chemical contact with its respective surface of the electrolyte, and each anode and cathode has a respective free surface 20, 22 forming one wall of a respective passageway 24, 26 for flow of gas across the surface. Anode 16 of fuel cell B faces and is electrically connected to an interconnect 28 by filaments 30 extending across but not blocking passageway 24, and cathode 18 of fuel cell A faces and is electrically connected to interconnect 28 by filaments 30 extending across but not blocking passageway 26. Similarly, cathode 18 of fuel cell B faces and is electrically connected to a cathodic current collector 32 by filaments 30 extending across but not blocking passageway 26, and anode 16 of fuel cell A faces and is electrically connected to an anodic current collector 34 by filaments 30 extending across but not blocking passageway 24.

Current collectors 32, 34 may be connected across a load 35 to enable the fuel cell stack 10 to perform electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32.

Interconnect 28 disposed between anode 16 and cathode 18 comprises a first surface 28a in electrical contact with anode 16 and a second surface 28b in electrical contact with cathode 18. Interconnect 28 is formed from a metal or metal alloy that typically includes chromium, for example, an iron-chromium alloy.

In the operation of fuel cell stack 10, reformate gas 21 is provided to passageways 24 at a first edge 25 of the anode free surface 20, flows parallel to the surface 20 of anode 16 across the anode in a first direction, and is removed at a second and opposite edge 29 of anode surface 20. Hydrogen and CO diffuse into anode 16 to the interface with electrolyte 14. Oxygen 31, typically in air, is provided to passageways 26 at a first edge 39 of the cathode free surface 22, flows parallel to the surface of cathode 18 in a second direction (omitted for clarity in FIG. 1) that is orthogonal to the first direction of the reformate flow, and is removed at a second and opposite edge 43 of cathode surface 22. Molecular oxygen gas diffuses into cathode 18 and is catalytically reduced to two oxygen ions by accepting four electrons from cathode 18 and cathodic current collector 32 of cell B or interconnect 28 of cell A via filaments 30. Electrolyte 14 is permeable to the oxygen ions that pass by electric field through the electrolyte and combine with four hydrogen atoms to form two water molecules, giving up four electrons to anode 16 and anodic current collector 34 of cell A or interconnect 28 of cell B via filaments 30. Thus, cells A and B are connected in series electrically between the two current collectors 32 and 34, and the total voltage and wattage between the current collectors is the sum of the voltage and wattage of the individual cells in fuel cell stack 10.

In accordance with the present invention, at least a portion of at least one of surfaces 28a and 28b of interconnect 28 comprises a layer of metallic cobalt, cobalt oxide, or a mixture thereof. A layer of metallic cobalt, which may be formed by, for example, electroplating, has a thickness preferably of about 0.5 micron to about 10 microns, more preferably, about 2.5 microns to about 5 microns. The metallic cobalt layer may be subjected to oxidizing conditions by, for example, heating in an oxygen-containing atmosphere to a temperature of about 800° C. for a period of about 15 minutes to about 8 hours, causing at least a portion of the metallic cobalt to be oxidized to cobalt oxide. The metallic cobalt can also be diffused into the surface of the chromium alloy substrate by heating to about 800° C. in a vacuum or in a non-oxidative atmosphere for a period of about 15 minutes to about 8 hours. This latter treatment produces a cobalt rich surface that, upon subsequent exposure to a controlled oxygen-containing atmosphere during the cooling phase of the cycle, can form a cobalt oxide layer.

A method of manufacturing a solid oxide fuel cell stack having an electrically conductive interconnect, may include the steps of:
 (a) providing a first solid oxide fuel cell and a second solid oxide fuel cell, wherein each of the fuel cells include an electrolyte sandwiched between an anode and a cathode;
 (b) providing a substrate comprising an iron-chromium alloy, wherein the substrate includes a first surface and a second surface opposite of the first surface;
 (c) depositing a layer of metallic cobalt over at least a portion of at least one of the first and second surfaces, wherein the layer of metallic cobalt has a thickness of about 0.5 micron to about 10 microns, preferably about 2.5 microns to about 5 microns;
 (d) subjecting the layer of metallic cobalt to reducing conditions for a predetermined time and temperature, such that a portion of the metallic cobalt is diffused into the iron-chromium alloy substrate, thereby forming a layer of cobalt-iron-chromium alloy, wherein the reducing conditions may include heating the layer of metallic cobalt to about 800° C. in a vacuum atmosphere for a time period of about 15 minutes to about 8 hours;
 (e) then exposing the remaining portion of the layer of metallic cobalt to oxidizing conditions for a predetermined time and temperature, such that the surface portion of the layer of metallic cobalt is oxidized to cobalt oxide, thereby forming the electrically conductive interconnect comprising the layer of metallic cobalt sandwiched between a surface layer of cobalt oxide and the layer of cobalt-iron-chromium alloy, wherein the oxidizing conditions include heating the remaining portion of the layer of metallic cobalt in an oxygen-containing atmosphere to a temperature of about 800° C. for a time period of about 15 minutes to about 8 hours; and
 (f) sandwiching the substrate between the first and second solid oxide fuel cells, wherein the first surface of the substrate is in electrical contact the anode of first fuel cell and the second surface of substrate is in electrical contact with the cathode of the second fuel cell.

Figure 2:
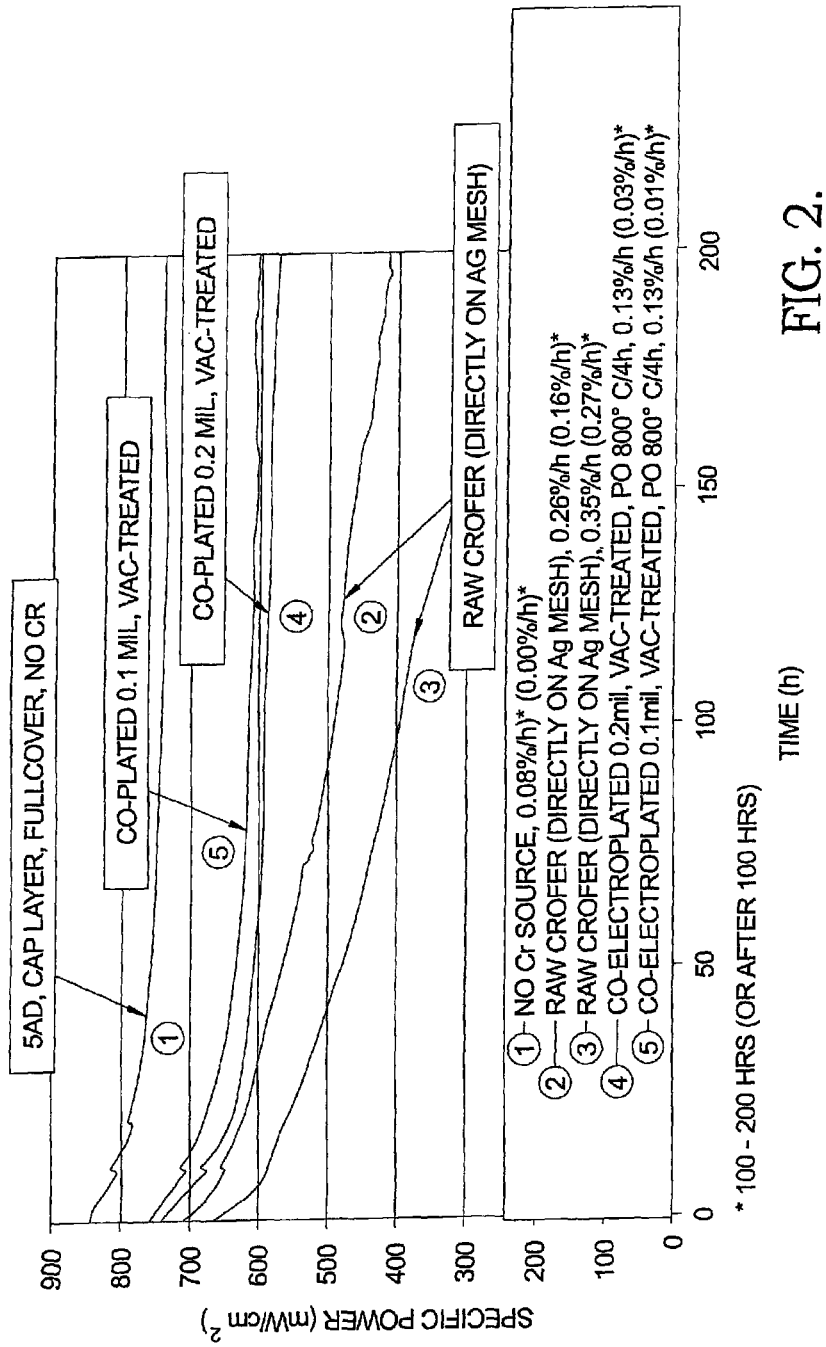
FIG. 2 is a graph containing a series of power vs. time curves that demonstrate the advantage of coating a chromium alloy interconnect with a cobalt-containing layer in accordance with the present invention.

FIG. 2 is a graph containing a series of plots of specific power in mW/cm$^2$ vs. time in hours that demonstrate the beneficial effect of coating a chromium alloy sample, representative of a fuel cell interconnect, with a cobalt-containing layer in accordance with the present invention.

Tests were carried out using a button cell having a 2.83 cm$^2$ active area and 5% A-site deficient LSCF6428 lanthanum-strontium-iron-cobaltite $(La_{0.6}Sr_{0.4})_{0.95}Co_{0.2}Fe_{0.8}O_3)$ cathode. A series of uncoated and coated Crofer 22 APU alloy discs, representing the interconnect alloy, were placed on top of a Ag current collecting mesh that is in contact with a fully covered Ag—Pd metallization layer of the cathode. Crofer discs were coated with Co-containing layers of 0.1 mil (2.5 microns) and 0.2 mil (5 microns). Before being placed on the cathode for testing, the electroplated Crofer discs were vacuum-treated and pre-oxidized at 800° C. for 4 hours to form a continuous Co oxide layer on the Crofer disc surface.

The results of coated Crofer samples are compared with the cells containing no Cr source (curve 1 of FIG. 2) and uncoated Crofer discs (curves 2 and 3 of FIG. 2). As shown by the test results, Cr poisoning of the cathode was significantly reduced for the Co-coated Crofer discs (curves 4 and 5 of FIG. 2) compared with the uncoated Crofer disc, with a fade rate of 0.01~0.03%/h vs. 0.16~0.27%/h at 100-200 hrs. Even though initial power densities of the Co-coated samples were slightly lower than that of the no-Cr sample, possibly due to initial Cr poisoning before testing, their fade rate were comparable to the baseline cathode performance of the no-Cr baseline source.

As demonstrated by the foregoing results, the layer of metallic cobalt, cobalt oxide, or mixture thereof is highly is highly effective in preventing formation of chromium oxide and other related species, and its subsequent detrimental reaction with the cathode. In addition, the resulting surface has high electrical conductivity that is stable over extended time in the high temperature operating environment. Similar results have also been obtained by deposition of the Co layer using other processes such as physical vapor deposition (PVD) or chemical vapor deposition (CVD).

While the invention has been described by reference to various specific embodiments, it should be understood that numerous changes may be made within the spirit and scope of the inventive concepts described. Accordingly, it should be recognized that the invention is not limited to the described embodiments but has full scope defined by the language of the following claims.

What is claimed is:

1. A method of manufacturing a solid oxide fuel cell stack having an electrically conductive interconnect, comprising the steps of:
   (a) providing a first fuel cell and a second fuel cell, wherein each of said fuel cells include an electrolyte sandwiched between an anode and a cathode;
   (b) providing a substrate comprising an iron-chromium alloy, wherein said substrate includes a first surface and a second surface opposite of said first surface;
   (c) depositing a layer of metallic cobalt over at least a portion of at least one of said first and second surfaces;
   (d) subjecting said layer of metallic cobalt to reducing conditions for a predetermined time and temperature, such that a portion of said metallic cobalt is diffused into said iron-chromium alloy substrate, thereby forming a layer of cobalt-iron-chromium alloy;
   (e) then exposing the remaining portion of said layer of metallic cobalt to oxidizing conditions for a predetermined time and temperature, such that the surface portion of said layer of metallic cobalt is oxidized to cobalt oxide, thereby forming said electrically conductive interconnect comprising said layer of metallic cobalt sandwiched between a surface layer of cobalt oxide and said layer of cobalt-iron-chromium alloy; and
   (f) sandwiching said substrate between said first and second fuel cells, wherein said first surface of substrate is in electrical contact said anode of first fuel cell and said second surface of substrate is in electrical contact with said cathode of said second fuel cell.

2. A method according to claim 1, wherein said reducing conditions comprise heating said layer of metallic cobalt to about 800° C. in a vacuum atmosphere for a time period of about 15 minutes to about 8 hours.

3. A method according to claim 2, wherein said oxidizing conditions comprise heating the remaining portion of said layer of metallic cobalt in an oxygen-containing atmosphere to a temperature of about 800° C. for a time period of about 15 minutes to about 8 hours.

4. A method according to claim 3 wherein said layer of metallic cobalt has a thickness of about 0.5 micron to about 10 microns.

5. A method according to claim 4 wherein said layer of metallic cobalt has a thickness of about 2.5 microns to about 5 microns.

* * * * *